G. F. DIETZ.
Thill-Coupling.
No. 65,182. Patented May 28, 1867.
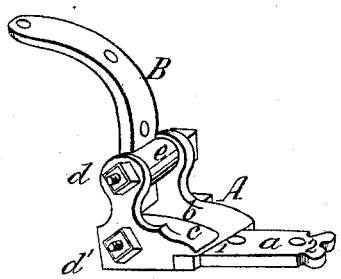
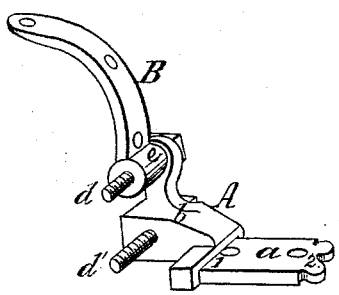
Witnesses.
Fred B Sears
W R Ronalds
Inventor.
George F. Dietz
per S. D. Law Atty.

United States Patent Office.

GEORGE F. DIETZ, OF BURLINGHAM, NEW YORK.

Letters Patent No. 65,182, dated May 28, 1867.

---

IMPROVEMENT IN ATTACHING THILLS TO VEHICLES.

---

The Schedule referred to in these Letters Patent and making part of the same.

---

TO ALL WHOM IT MAY CONCERN:

Be it known that I, GEORGE F. DIETZ, of Burlingham, in the county of Sullivan, and State of New York, have invented a new and useful Improvement in Carriage-Clips; and I do hereby declare that the following is a full, clear, and exact description thereof, and of its mode or manner of operation, reference being had to the accompanying drawings, and to the letters of reference marked thereon, and making a part of this specification.

My invention consists in such a construction of carriage-clip that it can be adjusted to receive parts or eyes of different widths, without it being necessary to loosen such clip on or remove it from the axle, and by which also all rattling of the parts can be more effectually prevented.

Figure 1 shows such a carriage-clip complete ready to be fixed to the carriage.

Figure 2 shows the clip with its movable part detached, and a separate view of which is also shown.

The plate $a$ of the clip A passes underneath the axle, and is secured thereto by a band passing over the axle and through the holes 1 and 2 in the plate $a$, and fastened by nuts on the under side of the axle. To the eye or curved neck B is fixed the thill or shaft, which is bent to correspond with the curve of such neck. The part of the clip that is attached to the axle, instead of being made solid and of a single piece of metal, as is generally the case, is made in two parts, $b$ and $c$, as shown more plainly in fig. 2. One of these parts $b$ is solid with the plate $a$, and is firmly fixed with such plate to the axle. The other part $c$ is movable, sliding on the fixed part, and is fastened thereto by two screws $d\ d'$, by which the two parts can be brought tightly together, or loosened, as desired or required.

Such form of construction permits the clip to take and hold eyes B of different sizes or widths, and renders it unnecessary to make such eyes exactly true on their edges, and also easily enables one to keep the eye constantly tight in the clip, as it is only necessary, when such eye becomes worn by use and thus gets loose, to turn the nuts on the screws $d\ d$, thereby tightening the parts and preventing rattling. By making also the plate $a$, by which the clip is fastened to the axle, solid with but one of the two parts of the clip, and making the other part movable thereon, the clip can be adjusted to receive the thill-irons or eyes B of different widths, without rendering it necessary to loosen the clip or take it from the axle, and thus such adjustment is not only effected much more easily and quickly, but all defacing or marring of the paint, &c., is wholly prevented and avoided. The action of the two screws $d\ d'$, in connection with the movable part of the clip, is also such that each causes the part $c$ to press outward against the nut of the other screw, and thus guards such nuts against becoming loosened by the jar of the vehicle. The use of two screws also diminishes danger of accident by reason of the coming off of the nuts and the bolt being thrown out, as either screw will hold the parts together, even if one may be detached.

An adjustable clip has heretofore been constructed, but such clip was divided lengthwise, and as well through that part fastened to the axle as the part in front of the axle. Each part of such clip required a separate band to fasten it to the axle, and whenever the clip required adjustment one of such bands had to be loosened and part of the clip moved on the axle. Such clip is both expensive and inconvenient for manipulation. With a clip constructed according to my invention, but a single band is required to fasten it to the axle, and it can be easily and quickly adjusted, and that without interfering with or loosening the part fixed to the axle.

What I claim as my invention, and desire to secure by Letters Patent, is—

A carriage-clip formed in two parts, so as to be adjustable, when so constructed that one part can be moved on the other without loosening the clip on or detaching it from the axle.

GEORGE F. DIETZ.

Witnesses:
JOHN O. ROMER,
JACOB R. ATKINS.